(12) United States Patent
Aharon et al.

(10) Patent No.: US 9,223,510 B2
(45) Date of Patent: Dec. 29, 2015

(54) OPTIMIZING STORAGE UTILIZATION BY MODIFYING A LOGICAL VOLUME OFFSET

(71) Applicant: GlobalFoundries Inc., Grand Cayman (KY)

(72) Inventors: Ofer Aharon, Givat Shmuel (IL); Itzhack Goldberg, Hadera (IL); Shai Harony, Kfar Sava (IL); Moriel Lechtman, Haifa (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 240 days.

(21) Appl. No.: 13/927,628

(22) Filed: Jun. 26, 2013

(65) Prior Publication Data

US 2015/0006833 A1 Jan. 1, 2015

(51) Int. Cl.
*G06F 3/06* (2006.01)

(52) U.S. Cl.
CPC ............ *G06F 3/0629* (2013.01); *G06F 3/0604* (2013.01); *G06F 3/0683* (2013.01); *G06F 2212/7202* (2013.01)

(58) Field of Classification Search
CPC ... G06F 3/0629; G06F 3/0683; G06F 3/0604; G06F 3/0608; G06F 3/0689; G06F 12/0246; G06F 2212/7202
See application file for complete search history.

(56) References Cited

U.S. PATENT DOCUMENTS

| 7,158,991 | B2 * | 1/2007 | Kekre et al. ............................ 1/1 |
| 7,818,535 | B1 * | 10/2010 | Bono et al. .................... 711/173 |
| 7,949,847 | B2 | 5/2011 | Murase |
| 2009/0216986 | A1 * | 8/2009 | Sakurai et al. ................. 711/170 |
| 2013/0173955 | A1 * | 7/2013 | Hallak et al. .................. 714/6.24 |

* cited by examiner

*Primary Examiner* — Hashem Farrokh

(57) ABSTRACT

Methods, apparatus and computer program products implement embodiments of the present invention that include arranging a first multiple of storage slices to store a second multiple of logical volumes, and assigning a respective offset to each of the logical volumes. Each of the logical volumes are then configured to start storing data at a first of the storage slices indicated by the assigned respective offset. In operation, data can be stored to a slice indicated by the assigned offset and an internal volume offset. Subsequent to configuring each of the logical volumes, one the storage slices having a highest storage utilization is identified, and one of the logical volumes having a highest number of physical regions in the identified storage slice is reconfigured to start storing the data at a second of the storage slices.

20 Claims, 4 Drawing Sheets

OPTIMIZING STORAGE UTILIZATION BY MODIFYING A LOGICAL VOLUME OFFSET

FIELD OF THE INVENTION

The present invention relates generally to data storage, and specifically to optimizing storage utilization by modifying an initial offset for a logical volume.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region, also referred to herein as a partition, is a sequence of bytes having a specific length, typically one megabyte) into larger virtual regions that administrators can re-size or move, potentially without interrupting system use.

To manage a given volume, a partition table can be utilized to define the relationship between a logical address of a logical volume and physical regions (also known as blocks and partitions) on the physical storage device. Upon receiving a request to perform an input/output (I/O) operation at a specific logical address in the given volume, a storage system can utilize the partition table identify the physical location on a storage device that corresponds to the specific logical address.

The description above is presented as a general overview of related art in this field and should not be construed as an admission that any of the information it contains constitutes prior art against the present patent application.

SUMMARY

There is provided, in accordance with an embodiment of the present invention a method, including arranging a first multiple of storage slices having multiple physical regions to store a second multiple of logical volumes, assigning a respective offset to each of the logical volumes, configuring each the logical volumes to start storing data at a first of the storage slices indicated by the assigned respective offset, subsequent to configuring each of the logical volumes, identifying one the storage slices having a highest storage utilization, and reconfiguring one of the logical volumes having a highest number of the physical regions in the identified one of the storage slices to start storing the data at a second of the storage slices.

There is also provided, in accordance with an embodiment of the present invention an apparatus, including a first multiple of storage slices having multiple physical regions and arranged to store a second multiple of logical volumes, and a processor configured to assign a respective offset to each of the logical volumes, to configure each the logical volumes to start storing data at a first of the storage slices indicated by the assigned respective offset, to identify, subsequent to configuring each of the logical volumes, one the storage slices having a highest storage utilization, and to reconfigure one of the logical volumes having a highest number of the physical regions in the identified one of the storage slices to start storing the data at a second of the storage slices.

There is further provided, in accordance with an embodiment of the present invention a computer program product, the computer program product including a non-transitory computer readable storage medium having computer readable program code embodied therewith, the computer readable program code including computer readable program code configured to arrange a first multiple of storage slices having multiple physical regions to store a second multiple of logical volumes, computer readable program code configured to assign a respective offset to each of the logical volumes, computer readable program code configured to arrange each the logical volumes to start storing data at a first of the storage slices indicated by the assigned respective offset, computer readable program code configured to identify, subsequent to arranging each of the logical volumes, one the storage slices having a highest storage utilization, and computer readable program code configured to rearrange one of the logical volumes having a highest number of the physical regions in the identified one of the storage slices to start storing the data at a second of the storage slices.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
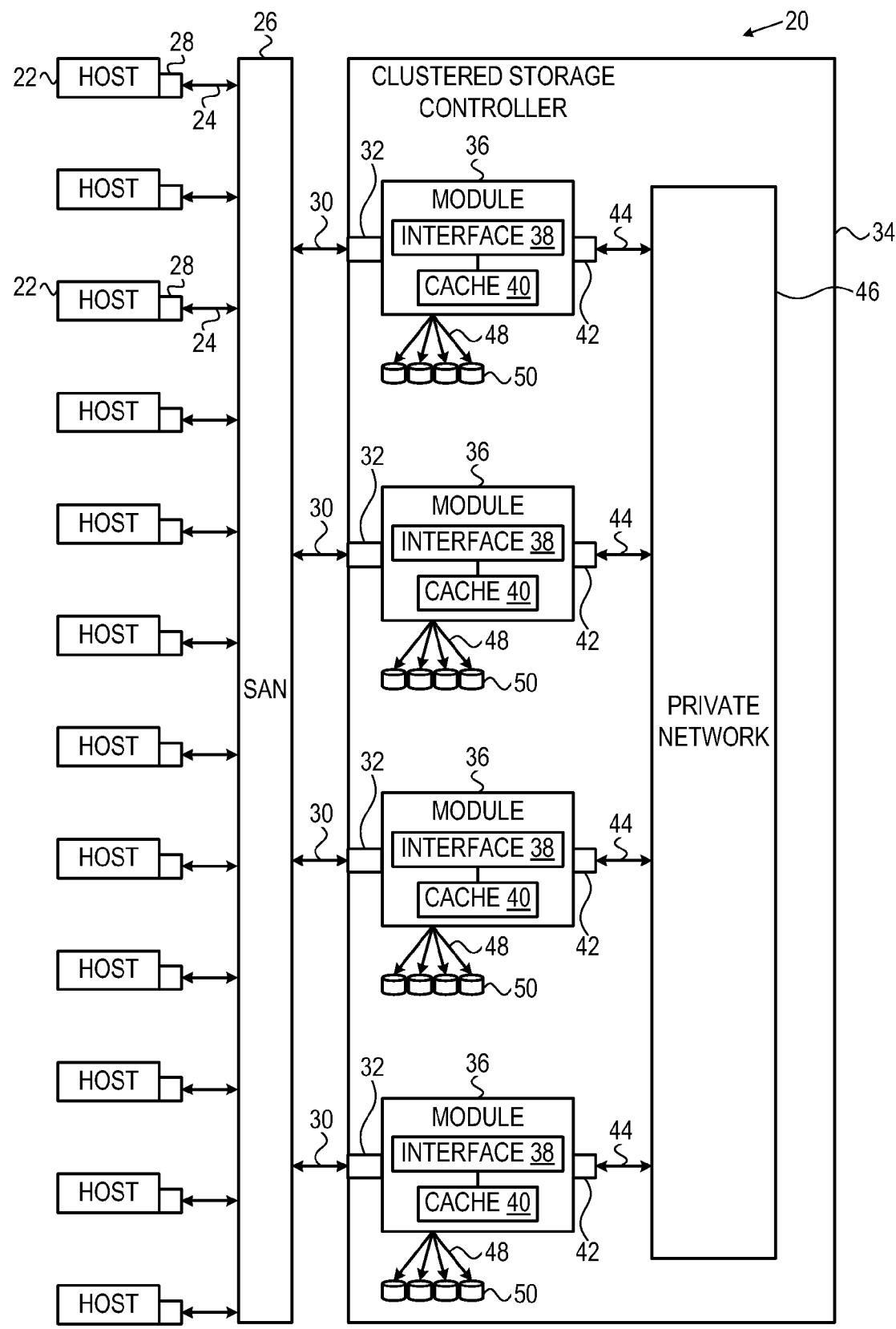
FIG. 1 is a block diagram that schematically illustrates a storage system, in accordance with an embodiment of the present invention.

One of the techniques employed by a storage system for disaster recovery planning is keeping periodic snapshots of data stored on the system. A snapshot may be a copy of data residing on a logical volume that is created at a particular point in time. Since a full backup of a large data set can take a long time to complete, a snapshot may define the dataset to be backed up. Data associated with the snapshot is static, and is therefore protected from any subsequent changes to the data stored in the volume (e.g., a database update).

One typical implementation of a snapshot is called a "pointer snapshot." A pointer snapshot records an index of data locations to be protected in the volume. Pointer snapshots can be created fairly quickly and require far less storage space than is required to maintain a separate copy of the snapshot data.

A storage system comprising multiple storage devices (such as a clustered storage controller described hereinbelow) can configure the storage devices to store a set of multiple storage slices (also referred to herein as slices). A slice comprises a "chunk" of data that can be stored on a given one of the storage devices, and can be configured to be shared by multiple logical volumes. Each storage device typically stores multiple slices, and the slices are typically arranged so that sequential slices are stored on different storage devices.

As described hereinbelow, the storage system may store multiple logical volumes, and start storing data for each of the logical volumes on a different slice. Each of the logical volumes can be assigned an offset (also referred to herein as a logical volume offset) indicating a starting slice for the respective logical volume. In operation, when first storing data to a given logical volume having a respective offset, the data is stored to a slice indicated by the respective offset (e.g., if the offset is seven, then the volume starts storing data on seventh slice in the system) and an internal offset for the volume.

Additionally, the storage system can allocate physical regions (also known as partitions) to the slices on an as-needed basis. In other words, to store logical volume data to a given slice, the storage system may first need to allocate one or more physical regions to the given slice in order to store the data. When allocating one or more physical regions to a given slice, the storage system typically allocates an identical number of physical regions to all slices in the storage system.

Embodiments of the present invention provide methods and systems for modifying one or more logical volume offsets in order to optimize storage utilization of the slices. As describe supra, each logical volume can be configured to have an initial offset indicating a given slice where the logical volume starts storing data. In some embodiments, a storage utilization can be calculated for all the storage slices in the system, and upon first identifying a slice having the highest storage utilization and then identifying a logical volume utilizing the highest number of physical regions in the identified slice, the identified logical volume can be reconfigured to start on a different slice, and the respective initial offset for the reconfigured logical volume can be updated to indicate its new starting slice.

As explained hereinbelow, by reconfiguring one or more logical volumes on highly utilized slices, embodiments of the present invention can identify physical regions that can be released, thereby reducing physical storage space required to store the slices. In some embodiments, the identified physical regions can be retained and used to store additional snapshots or "thinly provisioned" logical volumes. Typically, the highly utilized slice comprises a given slice having the highest storage utilization of the slices in the storage system, since moving the slice having the highest utilization can maximize the number of physical regions that can be released.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
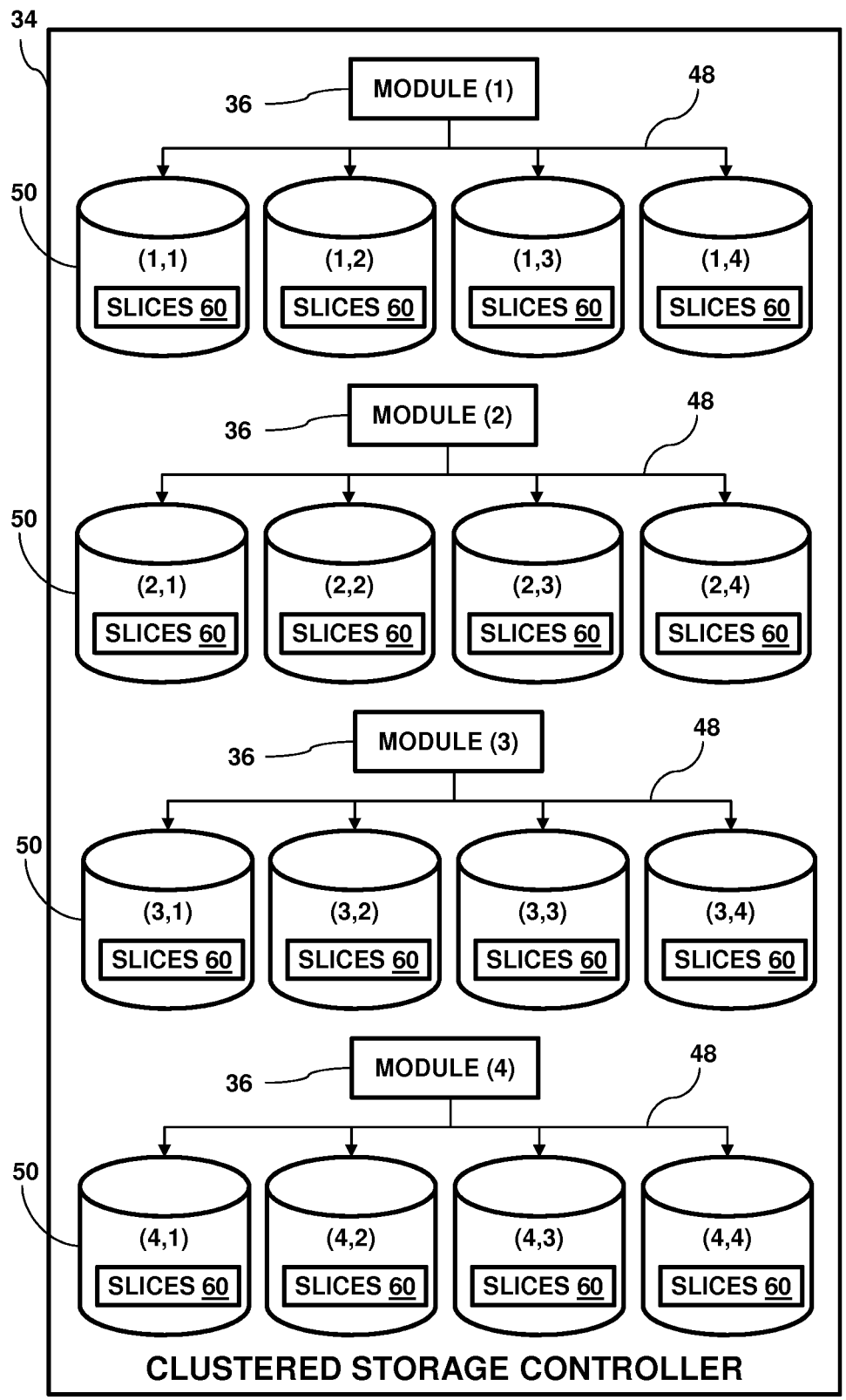
FIG. 2 is a block diagram that schematically illustrates an example of storage slices stored on a storage system, in accordance with an embodiment of the present invention.

FIG. 2 is a block diagram that schematically illustrates an example of slices 60 stored on storage devices 50 of clustered storage controller 34 (also referred to herein as a storage system), in accordance with an embodiment of the present invention. In the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Additionally, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Furthermore, each slice may be referenced by an identifier (C), where C is a number representing a given slice 60. For example, storage controller 34 may store 100 slices 60 on each storage device 50 so that storage controller 34 has 1,600 slices 60 that can be referenced as slice 60(1)-slice 60(1,600). Identifier C is also referred to herein as a slice number, so that each slice 60 has an associated slice number, and in the example, C is an integer between 1 and 1,600.

In operation, slices 60 can be stored so that consecutive slices are stored on different storage devices 50 in a cyclical manner. For example, in the configuration shown in FIG. 2 where 1,600 slices are distributed among 16 storage devices 50, slice 60(1) can be stored on storage device 50(1,1), slice 2 can be stored on storage device 50(1,2), slice 3 can be stored on storage device 50(1,3) etc. Likewise, slice 16 can be stored on storage device (4,4), slice 17 can be stored on storage device 50(1,1) etc.

Additionally, a given storage device 50 may store data associated with one or more snapshots for each logical volume (in a given slice 60) that is stored on the given storage device. When storing logical volumes, data stored at the beginning of a given logical volume is typically data that is updated frequently. For example, a volume header that stores metadata describing files in the given logical volume is typically stored at the beginning of the given logical volume. Since this data is updated more frequently, a given slice 60 storing a volume header for a given logical volume may store a higher amount of snapshot data than the other slices storing data for the given logical volume. Therefore, in some embodiments, for a given slice, storage controller 34 may store the updated logical volume data for the given slice and all the snapshot data (i.e., data previously stored on the slice to for the logical volume) to the same slice.

In embodiments herein, a storage utilization for a given slice 60 comprises a percentage of physical regions allocated to the given slice that are storing data for one or more logical volumes. For example, if each slice 60 comprises five physical regions and the given slice stores logical volume data on four physical regions, then the storage utilization for the given slice is 80%.

In order to balance the storage utilization among slices 60, storage controller 34 can assign a unique offset to each logical volume stored on storage devices 50. Each of the offsets indicates a starting slice 60 for a respective logical volume. For example, a first logical volume can start storing data on slice 60(5), a second logical volume can start storing data on slice 60(56), a third logical volume can start storing data on slice 60(98) etc.

Figure 3:
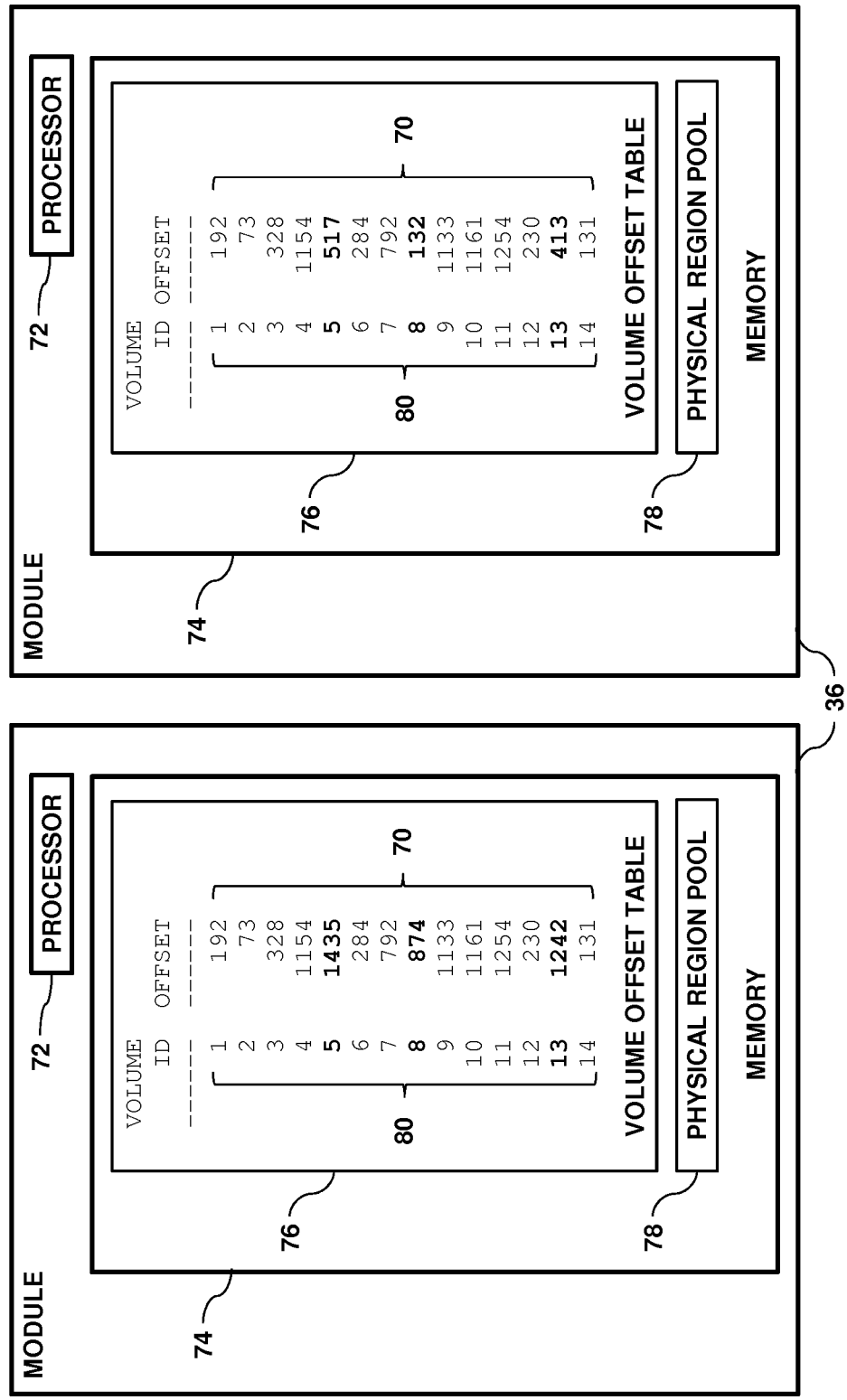
FIGS. 3A-3B, referred to collectively as FIG. 3, are block diagrams that schematically show functional elements of a module of the storage system, in accordance with an embodiment of the present invention.

FIGS. 3A and 3B are block diagrams that show functional elements of module 36, in accordance with an embodiment of the present invention. In the description herein, offsets 70 for the logical volumes stored on storage controller 34 are stored to a volume offset table 76. As described supra, embodiments of the present invention enable changing a staring slice of one or more logical volumes, thereby updating offsets 70 for the logical volumes. FIG. 3A shows initial offsets 70A, and FIG. 3B shows updated offsets 70B.

Module 36 comprises a processor 72 (also referred to herein as a host processor), and a memory 74. Memory 72 comprises a volume offset table 76 and a physical region pool 78. For each logical volume stored on storage controller 34, volume offset table 76 stores a volume identifier 80 and the corresponding starting offset 70. Each of the logical volumes slice may be referenced by an identifier (D), where D is a number representing a given volume identifier 80. In the example shown in FIG. 3, using embodiments described herein, processor 72 changes offsets 70 for the logical volumes referenced by volume identifier 80(5), volume identifier 80(8) and volume identifier 80(13).

Physical region pool 78 comprises a list of physical regions on storage devices 50 that have not yet been allocated to slices 60. In operation, while processor 72 is processing a storage command (e.g., a data write request or a snapshot request) that requires the processor to store data to an unused (i.e., new) physical region of a given slice, the processor may detect that all the physical regions allocated to the given slice are storing data, and therefore the given slice needs additional storage space. The processor can then identify, in physical region pool 78, physical regions on storage devices 50 that the processor can allocate to each slice 60, and allocate the identified physical regions to each slice 60 (i.e., in response to processing the storage command). In other words, due to the cyclical manner processor 72 stores data to a given logical volume on slices 60 (as described supra), even if only one slice needs one or more additional physical regions, processor 72 allocates an identical number of physical regions to all slices 60 (i.e., in a corresponding cyclical manner).

For example, in the configuration described in FIG. 2 (i.e., where storage controller 34 comprises 1,600 slices 60 stored among 16 storage devices 50), if processor 72 detects that a given slice 60 needs an additional physical regions, then the processor identifies, in physical region pool 78, 100 available physical regions on each storage device 50, and allocates one of the identified physical regions to each slice 60. Examples of instances when processor 72 detects that a given slice 60 needs one or more additional physical regions, include, but are not limited to:

If processor 72 updates existing data for a given logical volume to a given slice 60, and detects that there is no free physical region to store the existing version of the given logical volume in order to maintain a snapshot.

When storing data to a given logical volume which is thinly provisioned, processor 72 may detect that a given slice 60 does not have enough space to store the data.

Therefore, while each slice 60 typically has the same number of physical regions, there may be an imbalance in the storage utilization of slices 60. For example, if data in a given slice 60 is updated frequently, thereby resulting in more physical regions that are in use to store snapshots for the given slice, the given slice may require four additional physical regions than other slices 60 stored on storage devices 50. In the configuration described in FIG. 2, if there are 1,600 slices 60 and each physical region is one megabyte (MB), if a given slice 60 is using one more physical region than the other slices in the system, then there may be 1,599 physical regions (i.e., 1.599 MB) allocated to slices 60 that are not being used.

Additionally, different slices 60 may have different utilization levels. For example, if there are four physical regions allocated to each slice 60, then utilization for a given slice ranges from 0% (where no logical volumes store data in the given slice) to 100% (where one or more logical volumes store data on all four physical regions allocated to the given slice. In the embodiments described herein processor 72 can balance the storage utilization of slices 60, by returning, to physical region pool 78, physical regions that are no longer needed.

Processor 72 typically comprises a general-purpose computer, which is programmed in software to carry out the functions described herein. The software may be downloaded to processor 72 in electronic form, over a network, for example, or it may be provided on non-transitory tangible media, such as optical, magnetic or electronic memory media. Alternatively, some or all of the functions of processor 72 may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Storage Slice Reconfiguration

Figure 4:
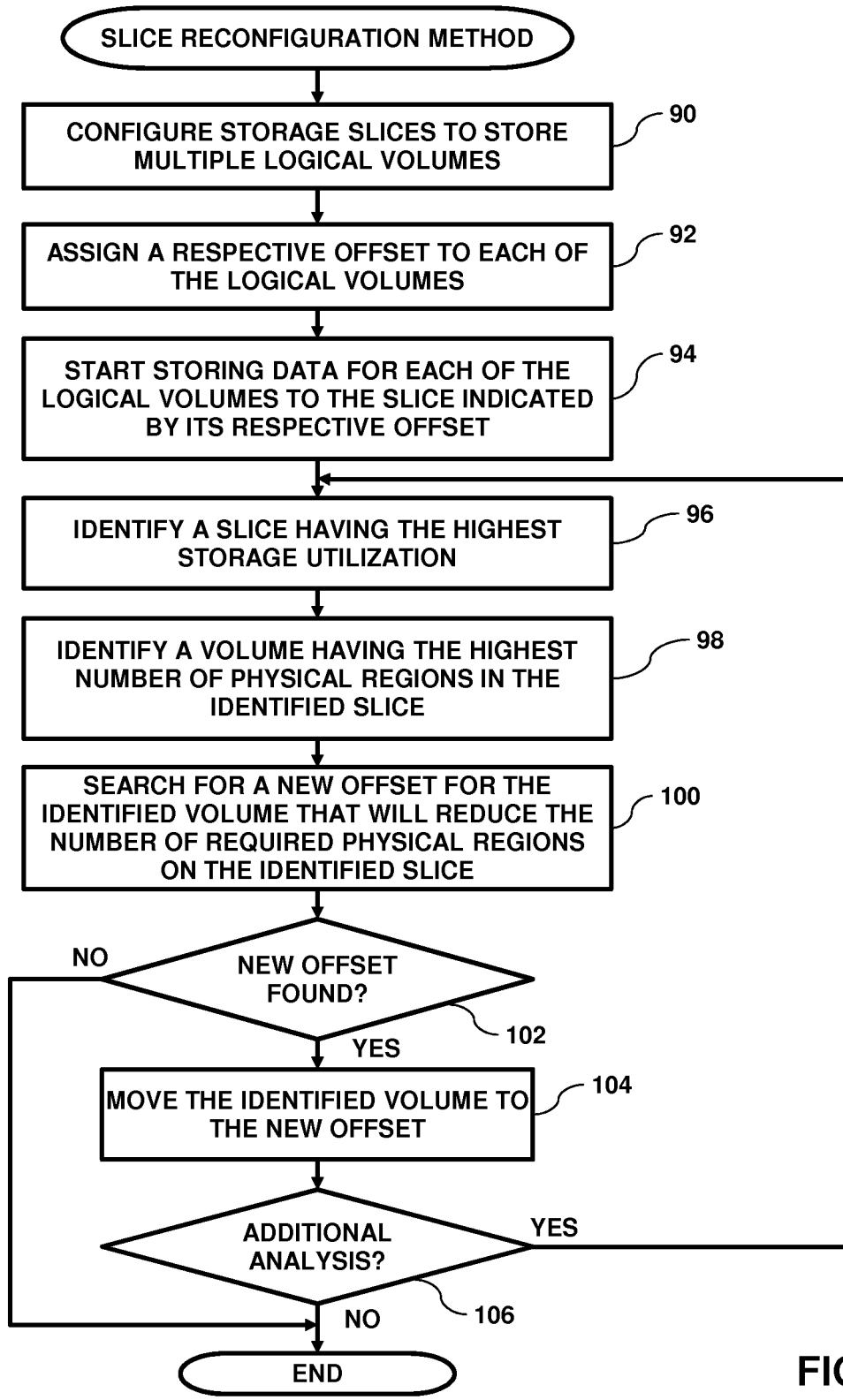
FIG. 4 is a flow diagram that schematically illustrates a method of reconfiguring a given one of the storage slices, in accordance with an embodiment of the present invention.

FIG. 4 is a flow diagram that schematically illustrates a method of reconfiguring a given slice 60 on clustered storage controller 34, in accordance with an embodiment of the present invention. In a configuration step 90, processor 72 configures slices 60 to store multiple logical volumes, and in an assign step 92, the processor assigns a respective initial offset 70 to each of the logical volumes. As described supra, each of the logical volumes can be assigned a unique offset, since the starting slice of a given logical volume typically has the highest storage utilization relative to the other slices 60 storing data for the given logical volume.

In a storing step 94, processor 72 starts processing storage commands, and starts storing data to the logical volumes in response to the storage commands. When storing the data to a given logical volume, processor 72 starts storing the data to a given slice 60 indicated by the respective offset 70 for the given logical volume and an internal offset within the given logical volume. Examples of storage commands received by processor 72, include, but are not limited to, snapshot requests and data write requests. Processing storage requests may add data to one or more of storage slices 60, thereby increasing the storage utilization of the one or more of the storage slices.

When storing data to the logical volumes, processor 72 may update a volume header typically stored in the first slice (i.e., the slice indicated by the volume's offset). Additionally, when adding data to a logical volume, processor 72 typically appends the data to the volume. Additionally, as described supra, processor 72 may periodically take a snapshot of the logical volumes stored on slices 60. Therefore, due to updated metadata and appended data, the first slice 60 of a given logical volume may utilize more physical regions (on the storage devices) than the other slices storing data for the given logical volume. Alternatively, a different slice (i.e., other than the first slice) storing data for a given logical volume may utilize more physical regions than the other slices storing data for the given logical volume.

In an first identification step 96, processor 72 analyzes slices 60 and identifies a given slice 60 having the highest storage utilization, and in a second identification step 98, the processor determines a respective number of physical regions allocated to logical volumes storing data in the identified highly utilized slice, and identifies the logical volume having the highest number of allocated physical regions in the identified highly utilized slice. As described supra, the utilization of slices 60 ranges between 0%-100%.

In a locate step 100, processor 72 analyzes slices 60 to search for a new offset that can reduce the number of physical regions used to store data in the identified slice upon moving the identified volume to the new offset. When performing the analysis, processor 72 can first identify how many slices 60 that are currently storing data for the identified logical volume, and then identify a corresponding number of consecutive slices 60 having the lowest storage utilization.

As described supra, data stored at the beginning of a given logical volume is typically data that is updated frequently, and consequently, the slice referenced by the respective offset for a given logical volume is typically highly utilized. Therefore, when performing the analysis, processor 72 can limit the search to slices 60 that are not referenced by any of the offsets in storage controller 34.

In a first comparison step 102, if processor 72 locates a new offset, then in a move step 104, the processor moves the identified volume from to the new offset located in step 100. To move the identified logical volume, copies physical regions storing data, processor 60 identifies a source set of physical regions in slices 60 (i.e., starting at the slice referenced by the initial offset) that are currently storing data for the identified logical volume, and copies data from the source set physical regions to a corresponding target set of physical regions in slices 60 that start with a given slice 60 referenced by the new offset.

If processor 72 receives a request to update a given source physical region while copying the identified logical volume, the processor can maintain integrity of the identified logical volume by updating both the given source physical region and the corresponding target physical region. Updating both the source and the physical regions enables the copying process to be "rolled back" in the event of a hardware and/or software failure in storage controller 34. Upon completing copying the source physical regions to the target physical regions, processor 72 can "release" the source physical regions by updating physical region pool 78 with the source physical regions.

In a second comparison step 106, if there is additional analysis to be performed on slices 60, then the method returns to step 96. If, on the other hand, no further analysis is needed, then the slice reconfiguration is complete and the method ends.

Processor 72 can set specific criteria to determine, in step 106, if additional analysis needs to be performed. For example, processor 72 can set a number of maximum iterations for the analysis (i.e., repeat steps 96-104), and end the analysis upon reaching the maximum number of iterations. Additionally or alternatively, processor 72 may set a threshold, and processor 72 can end the analysis upon the number of physical regions that can be released back to physical region pool 78 during the analysis. For example, processor 72 can set a threshold of 5%, and therefore end the iterations upon releasing 5% of the physical regions allocated to slices 60 back to physical region pool 78.

Returning to step 102, if processor 72 does not locate a new offset for the identified slice, then processor 72 cannot release any physical regions to region pool 78 and the method ends. As described supra, all slices 60 have an identical number of physical regions at any given time. Therefore, if a given slice having a given number of physical regions has the highest storage utilization and cannot be moved using embodiments described herein, then all slices 60 will also have the given number of physical regions.

Upon completing the steps described in the flow diagram shown in FIG. 4, processor 72 can analyze slices 60 to detect if any physical regions can be released to physical region pool 78. For example, if prior to reconfiguring slices 60, there were ten physical regions allocated to each slice 60 (i.e., due to the cyclical manner processor 72 allocates physical regions to slices 62 as described supra), and after reconfiguring the slices, the highest utilized slice used eight physical regions, then processor 72 can release two corresponding physical regions from each slice 60 to physical region pool 78.

In some embodiments, processor 72 can analyze slices 60, and perform steps 96-104 for the slices having the highest storage utilizations. In additional embodiments, processor 72 can perform steps 96-104 as a simulation before actually reconfiguring slices 60. For example, processor 72 can identify slices having the highest storage utilizations, perform an iteration of the simulation for each of the identified slices, and determine how many physical regions can be released by reconfiguring each of the identified slices. Processor 72 can then use on the results of the iterations to determine which of the identified slices to reconfigure.

In supplementary embodiments, a threshold (e.g., 5%) can be defined, and if the simulation analysis performed in steps 96-104 indicate that the threshold percentage of allocated physical regions can be released, then the processor can reconfigure the volumes storing data in the identified slice. In further embodiments, the analysis may comprise multiple iterations of steps 96-104, with processor 72 simulating the reconfiguration of the slice with the highest storage utilization identified in each of the iterations, and applying the threshold to the physical regions that can be released during all the iterations.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    arranging, by a host processor, a first multiple of storage slices having multiple physical regions to store a second multiple of logical volumes;
    assigning a respective offset to each of the logical volumes;
    configuring each the logical volumes to start storing data at a first of the storage slices indicated by the assigned respective offset;
    subsequent to configuring each of the logical volumes, identifying, by the host processor, one the storage slices having a highest storage utilization; and
    reconfiguring one of the logical volumes having a highest number of the physical regions in the identified one of the storage slices to start storing the data at a second of the storage slices.

2. The method according to claim 1, and comprising prior to identifying the one of the storage slices having a high storage utilization, processing a storage command for one of the multiple volumes, and allocating, from a physical region pool, one or more corresponding physical regions to each of the multiple storage slices in response to the storage command.

3. The method according to claim 2, wherein the storage command is selected from a list comprising a snapshot request and a data write request.

4. The method according to claim 2, wherein processing the storage command comprises adding data to one or more of the storage slices, thereby increasing the storage utilization of the one or more of the storage slices.

5. The method according to claim 2, and comprising subsequent to reconfiguring the one of the logical volumes, identifying corresponding physical regions on all of the storage slices not storing data for any of the logical volumes, and releasing the identified corresponding regions to the physical region pool.

6. The method according to claim 5, and comprising repeating the identifying and the reconfiguring until meeting a specific criteria, the specific criteria selected from a list comprising a maximum number of iterations and a number of physical regions that can be released to the physical region pool.

7. The method according to claim 1, wherein reconfiguring the one of the logical volumes comprises copying the data from a source set of one or more consecutive slices starting with the first of the storage slices to a target set of one or more slices starting with the second of the storage slices.

8. The method according to claim 1, and comprising updating the respective offset for the one of the logical volumes to indicate the second of the storage slices.

9. The method according to claim 1, wherein identifying the one the storage slices comprises calculating a respective storage utilization for each of the first multiple of storage slices and identifying the one of the storage slices having the highest calculated storage utilization.

10. An apparatus, comprising:
    a first multiple of storage slices having multiple physical regions and arranged to store a second multiple of logical volumes; and
    a host processor configured to assign a respective offset to each of the logical volumes, to configure each the logical volumes to start storing data at a first of the storage slices indicated by the assigned respective offset, to identify, subsequent to configuring each of the logical volumes, one the storage slices having a highest storage utilization, and to reconfigure one of the logical volumes having a highest number of the physical regions in the identified one of the storage slices to start storing the data at a second of the storage slices.

11. The apparatus according to claim 10, wherein prior to identifying the one of the storage slices having a high storage utilization, the host processor is configured to process a storage command for one of the multiple volumes, and to allocate, from a physical region pool, one or more corresponding physical regions to each of the multiple storage slices in response to the storage command.

12. The apparatus according to claim 11, wherein the storage command is selected from a list comprising a snapshot request and a data write request.

13. The apparatus according to claim 11, wherein the host processor is configured to process the storage command by adding data to one or more of the storage slices, thereby increasing the storage utilization of the one or more of the storage slices.

14. The apparatus according to claim 11, wherein subsequent to reconfiguring the one of the logical volumes, the host processor is configured to identify corresponding physical regions on all of the storage slices not storing data for any of the logical volumes, and to release the identified corresponding regions to the physical region pool.

15. The apparatus according to claim 14, wherein the host processor is arranged to repeat the identification the reconfiguration until meeting a specific criteria, the specific criteria selected from a list comprising a maximum number of iterations and a number of physical regions that can be released to the physical region pool.

16. The apparatus according to claim 10, wherein the host processor is configured to reconfigure the one of the logical volumes by copying the data from a source set of one or more consecutive slices starting with the first of the storage slices to a target set of one or more slices starting with the second of the storage slices.

17. The apparatus according to claim 10, wherein the host processor is configured update the respective offset for the one of the logical volumes to indicate the second of the storage slices.

18. The apparatus according to claim 10, wherein the host processor is configured to identify the one the storage slices by calculating a respective storage utilization for each of the first multiple of storage slices and identifying the one of the storage slices having the highest calculated storage utilization.

19. A computer program product, the computer program product comprising:
   a non-transitory computer readable storage medium having computer readable program code embodied therewith, the computer readable program code comprising:
   computer readable program code configured to arrange a first multiple of storage slices having multiple physical regions to store a second multiple of logical volumes;
   computer readable program code configured to assign a respective offset to each of the logical volumes;
   computer readable program code configured to arrange each the logical volumes to start storing data at a first of the storage slices indicated by the assigned respective offset;
   computer readable program code configured to identify, subsequent to arranging each of the logical volumes, one the storage slices having a highest storage utilization; and
   computer readable program code configured to rearrange one of the logical volumes having a highest number of the physical regions in the identified one of the storage slices to start storing the data at a second of the storage slices.

20. The computer program product according to claim 19, and comprising computer readable program code configured to identify, subsequent to rearranging the one of the logical volumes, corresponding physical regions on all of the storage slices not storing data for any of the logical volumes, and to release the identified corresponding regions to the physical region pool.

* * * * *